United States Patent [19]
Mabboux et al.

[11] Patent Number: 5,654,591
[45] Date of Patent: Aug. 5, 1997

[54] UNINTERRUPTIBLE POWER SUPPLY WITH PASSING NEUTRAL, COMPRISING A TWIN STEP-UP CHOPPER

[75] Inventors: Henri Mabboux, Eybens; Olivier Parrot, Grenoble, both of France

[73] Assignee: Schneider Electric SA, France

[21] Appl. No.: 345,462

[22] Filed: Nov. 21, 1994

[30] Foreign Application Priority Data

Nov. 24, 1993 [FR] France .................. 93 14145

[51] Int. Cl.$^6$ .................................................. H02J 7/00
[52] U.S. Cl. .................. 307/66; 307/64; 323/280; 363/34; 363/123; 363/124; 363/37; 363/21; 363/137; 363/54; 363/86
[58] Field of Search .............. 307/64, 66; 323/280; 363/34, 123, 124, 37, 21, 137, 54, 86

[56] References Cited

U.S. PATENT DOCUMENTS

| | | |
|---|---|---|
| 4,719,559 | 1/1988 | Sokai et al. . |
| 4,823,247 | 4/1989 | Tamoto ................... 363/16 |
| 5,126,585 | 6/1992 | Boys . |
| 5,218,522 | 6/1993 | Phelps et al. ............ 363/124 |

FOREIGN PATENT DOCUMENTS 2111326  6/1983  United Kingdom .

Primary Examiner—William M. Shoop, Jr.
Assistant Examiner—Kim Lockett
Attorney, Agent, or Firm—Parkhurst, Wendel & Burr, L.L.P

[57] ABSTRACT

An uninterruptible power supply, with passing neutral, comprises a twin step-up chopper whose input is connected to a battery and to a rectifier circuit connected to the mains power system. The twin step-up chopper comprises a positive step-up chopper supplying a first output voltage between a positive DC output and neutral, and a negative step-up chopper supplying a second output voltage between a negative DC output and neutral. The control circuit of the twin step-up chopper comprises means for regulating imbalance between the output voltages of the positive and negative step-up choppers, suitable both for operation on the mains power system and for operation on the battery.

11 Claims, 5 Drawing Sheets

UNINTERRUPTIBLE POWER SUPPLY WITH PASSING NEUTRAL, COMPRISING A TWIN STEP-UP CHOPPER

BACKGROUND OF THE INVENTION

The invention relates to an uninterruptible power supply with passing neutral.

In most uninterruptible power supplies with common neutral between the input and output, a first rectifier stage supplies, from the mains power system, a DC voltage on a DC bus, to the terminals of two serially-connected capacitors whose mid-point is connected to the common neutral. The output AC voltage of the power supply is obtained between the common neutral and the output of a half-bridge DC-AC converter connected to the terminals of the DC bus. A battery is connected to the DC bus via a DC-DC converter.

In the document GB-A-2,111,326, the rectifier stage comprises two diodes forming a doubler and the DC-DC converter which interfaces the battery bank comprises an H.F. step-up transformer. The use of single rectification does not enable an AC voltage of sufficient amplitude to be guaranteed on output whatever the tolerances of the input power system.

The document U.S. Pat. No. 5,126,585 describes an uninterruptible power supply in which the rectifier stage comprises a reversible rectifier and the DC-DC converter which interfaces the battery bank by a single step-up chopper.

It has also been proposed to connect a twin step-up chopper between a first DC bus, connected both to the output of a rectifier and to the output of a DC-DC converter, with an H.F. transformer having a secondary with mid-point and whose primary is connected to the battery, and a second DC bus connected to the input of the DC-AC converter. The common neutral is then connected to the mid-point of the transformer and to the mid-point of two capacitors connected in series both upline and downline from the twin step-up chopper. In this power supply, as in the previous one, a DC-DC converter is dedicated to the battery bank.

SUMMARY OF THE INVENTION

The object of the invention is to provide an uninterruptible power supply with common neutral between the input and output, or passing neutral, which is inexpensive, minimizes the number of power components and is suitable for medium powers.

According to the invention this object is achieved by an uninterruptible power supply comprising rectifier means connected to an AC mains power system and comprising positive and negative outputs, a battery connected to the outputs of the rectifier means, a twin step-up chopper comprising a positive chopper circuit, having an input connected to the positive output of the rectifier means, a negative chopper circuit, having an input connected to the negative output of the rectifier means, and a control circuit connected to the twin step-up chopper so that the positive chopper circuit supplies a first DC voltage between an intermediate output and a positive conductor and that the negative chopper circuit supplies a second DC voltage between said intermediate output and a negative conductor. The uninterruptible power supply further comprises a DC-AC conversion means being connected between the negative and positive conductors, the mains power system comprising a neutral conductor connected directly to said intermediate output and to an output of the DC-AC conversion means, the control circuit comprises means for regulating an unbalance between the absolute values of said first and second DC voltages.

The use of a single controlled step-up stage and regulation, by the control circuit of the step-up stage, of the output mid-point of the twin step-up chopper, both when the power supply is operating on the battery and on the mains power system, enable the cost of the power supply to be minimized while providing the required performances. A power supply of this kind is more particularly suited for medium powers, of about 5 to 30 KVA.

According to one embodiment of the invention, the means for regulating an unbalance comprises means for measuring the first and second DC voltages, first difference determining means for determining the difference between the absolute values of the first and second DC voltages, first correction means connected to the first difference determining means, an inverter connected to the first difference determining means and comprising an output connected to an input of second correction means, switching means having a first input connected to an output of the first correction means, a second input connected to an output of the second correction means, and a control input to connect the first input of the switching means to an output of the means for regulating an unbalance when the power supply device is operating on mains power and to connect the second input of the switching means to said output when the power supply device is operating on the battery.

The first and second correction means each comprise an integrator and a zero reset input the integrator of the first correction means being held at zero when the power supply is operating on the battery and the integrator of the second correction means being held at zero when the power supply is operating on the mains power system.

In a preferred embodiment, the control circuit comprises means for regulating the voltage between the positive and negative conductors, first and second current regulating means respectively associated to each of the chopper circuits, the output of the means for regulating an unbalance being connected to an input of each of the current regulating means. Unbalance regulation is thus added to double voltage and current regulation.

According to another embodiment of the invention, the first and second current regulating means each comprise forcing means for forcing a value representative of a reference current to a preset value, and control means of said forcing means comprising means for comparing the first and second DC voltages with respective preset thresholds.

Preferably, when the device is supplied by the battery, the control means supply a control signal of the forcing means of the positive and negative chopper circuits if the first and second DC voltages are simultaneously lower than their respective thresholds, a control signal of the forcing means of the positive chopper circuit if the second DC voltage is lower than the associated threshold whereas the first DC voltage is higher than the associated threshold, and a control signal of the forcing means of the negative chopper circuit if the first DC voltage is lower than the associated threshold whereas the second DC voltage is higher than the associated threshold.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 1:
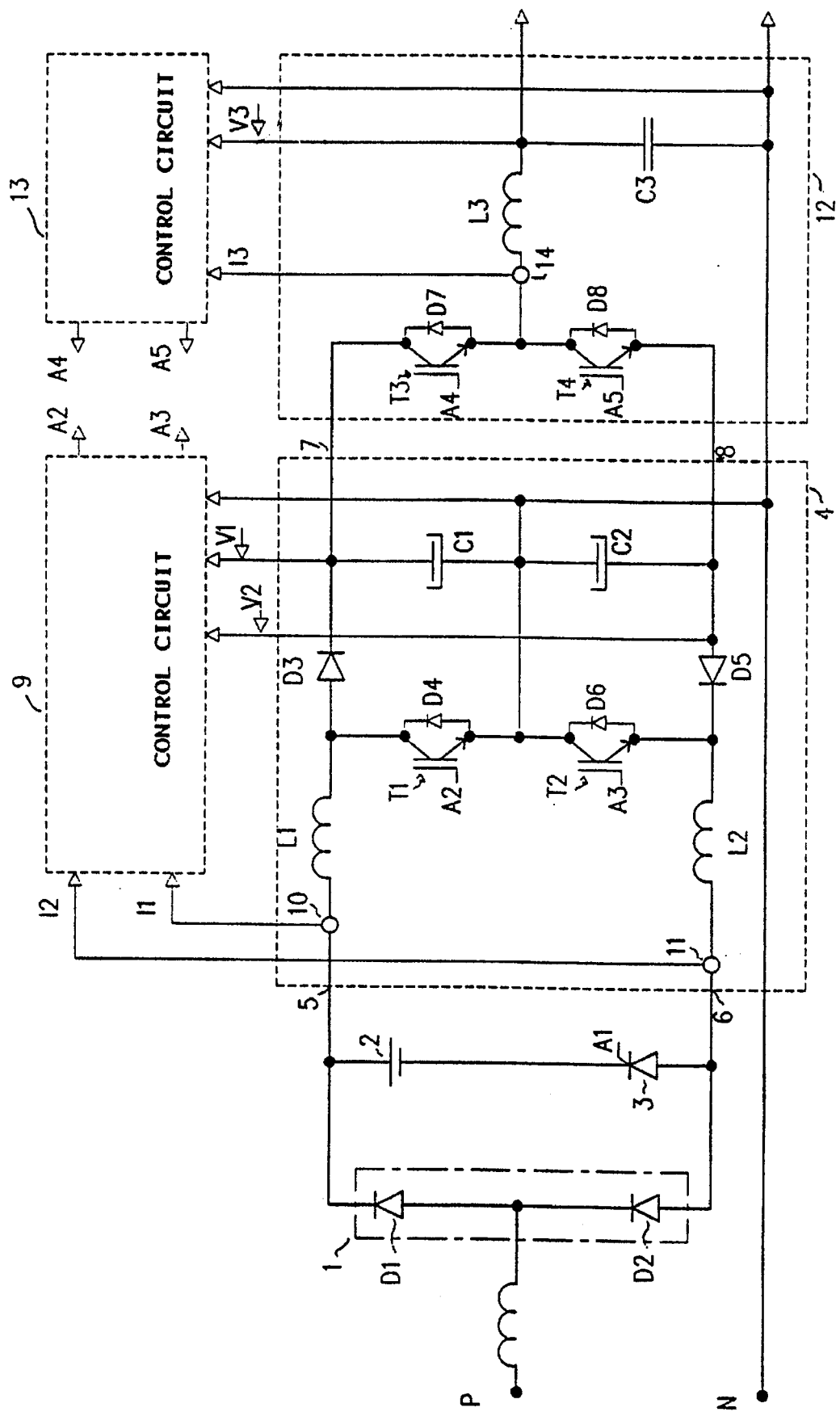
FIG. 1 illustrates, in block diagram form, an uninterruptible power supply in which the invention is implemented.

The uninterruptible power supply of FIG. 1 is connected to a single-phase AC power system, comprising a phase conductor P and a neutral conductor N. The neutral conductor N, called common neutral or passing neutral, is connected directly to an output of the power supply.

The phase conductor P is connected to the input of a rectifier 1. In FIG. 1, the rectifier is formed by two diodes D1 and D2 connected in series between the positive and negative outputs of the rectifier. The phase conductor is connected, via an inductance to the common point of the diodes D1 and D2. The rectifier 1 thus forms a twin half-wave rectifier.

Figure 2:
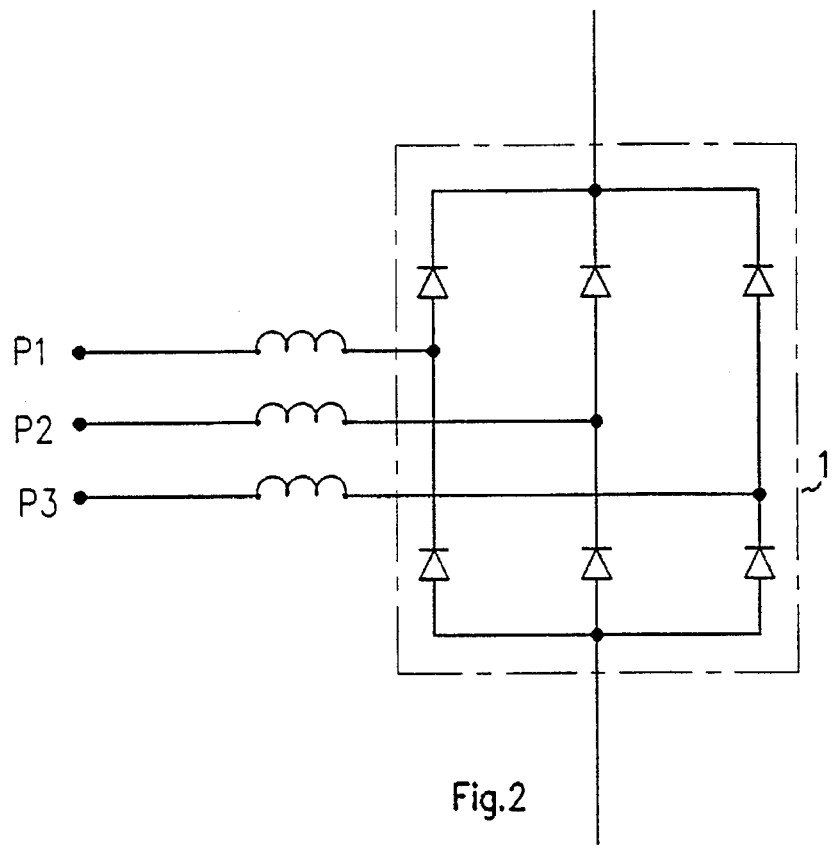
FIG. 2 represents an alternative embodiment of the rectifier when the power supply is connected to a three-phase power system.

FIG. 2 represents an alternative embodiment of the rectifier 1, adapted to the case where the power system is a three-phase system. In this case, each of the phase conductors P1, P2, P3 of the power system is connected to a branch of the rectifier, constituted in the same way as in the case of a single-phase power system, the three branches of the rectifier being connected in parallel.

To enable the rectifier output voltage to be controlled, notably on power-up or when the power system is out of tolerance, the diodes can be replaced by thyristors.

A battery 2 is connected to the output terminals of the rectifier via a static switch 3 formed in the figure by a thyristor. The thyristor receives a control signal A1 on a control input. Signal A1 is supplied by a power system status detection circuit, not represented. When the power system voltage is within acceptable predetermined tolerance limits, signal A1 orders opening of the static switch 3, i.e. turn-off of the thyristor. As soon as the power system voltage goes outside these tolerances however, signal A1 orders closing of the static switch so as to connect the battery 2 in parallel to the output of the rectifier 1, the uninterruptible power supply then running on the battery.

The uninterruptible power supply comprises a twin step-up chopper 4 comprising two inputs 5 and 6, respectively connected to the positive and negative outputs of the rectifier 1. The twin step-up chopper 4 comprises a positive step-up chopper connected to the input 5 and a negative step-up chopper connected to the input 6.

The positive step-up chopper comprises an inductance L1 connected in series with a diode D3 between the input 5 and a positive output 7. A static switch T1, formed in the figure by an IGBT transistor, is connected downline from the inductance L1, between the point common to L1 and D3 and an intermediate output directly connected to the neutral conductor N. A diode D4 is reverse connected in parallel on the transistor T1. Likewise, the negative step-up chopper comprises an inductance L2 connected in series with a diode D8 between the input 6 and a negative output 8. A static switch T2, for example formed by an IGBT transistor, is connected downline from the inductance L2, between the intermediate output and the point common to L2 and D5. A diode D6 is reverse connected in parallel on the transistor T2.

Two capacitors C1 and C2 are connected in series between the outputs 7 and 8, their mid-point being connected to the intermediate output. A control circuit 9 supplies control signals, A2 and A3, respectively to control inputs of the static switches T1 and T2. Current sensors 10 and 11 measure the currents I1 and I2 flowing respectively in the input inductances L1 and L2 of the positive and negative choppers and supply the measured values to the control circuit. The control circuit also comprises inputs connected respectively to the positive conductor connected to the output 7, to the negative conductor connected to the output 8 and to the neutral conductor N, to receive signals representative respectively of the voltages V1 and V2 of the positive and negative conductors with respect to the neutral.

The outputs 7 and 8 of the twin step-up chopper 4 are connected to the inputs of a DC-to-AC converter 12. In the embodiment represented in FIG. 1, the converter 12 comprises a half-bridge assembly comprising, in known manner, two static switches T3 and T4, of IGBT type, in series between the outputs 7 and 8. Diodes D7 and D8 are respectively reverse mounted in parallel on T3 and T4. The point common to the static switches T3 and T4 is connected, by an inductance L3, to an output of the uninterruptible power supply whose second output is formed by the neutral N. A capacitor C3 is connected in conventional manner between the outputs of the converter 12. A control circuit 13 supplies control signals, A4 and A5, respectively to control inputs of the static switches T3 and T4. The control circuit comprises inputs connected to the terminals of C3 to receive signals representative of the power supply output voltage V3. A current sensor 14 supplies the control circuit 13 with signals representative of the current I3 flowing in the inductance L3. Operation of the control circuit 13 is conventional and will not be described in greater detail.

Figure 3:
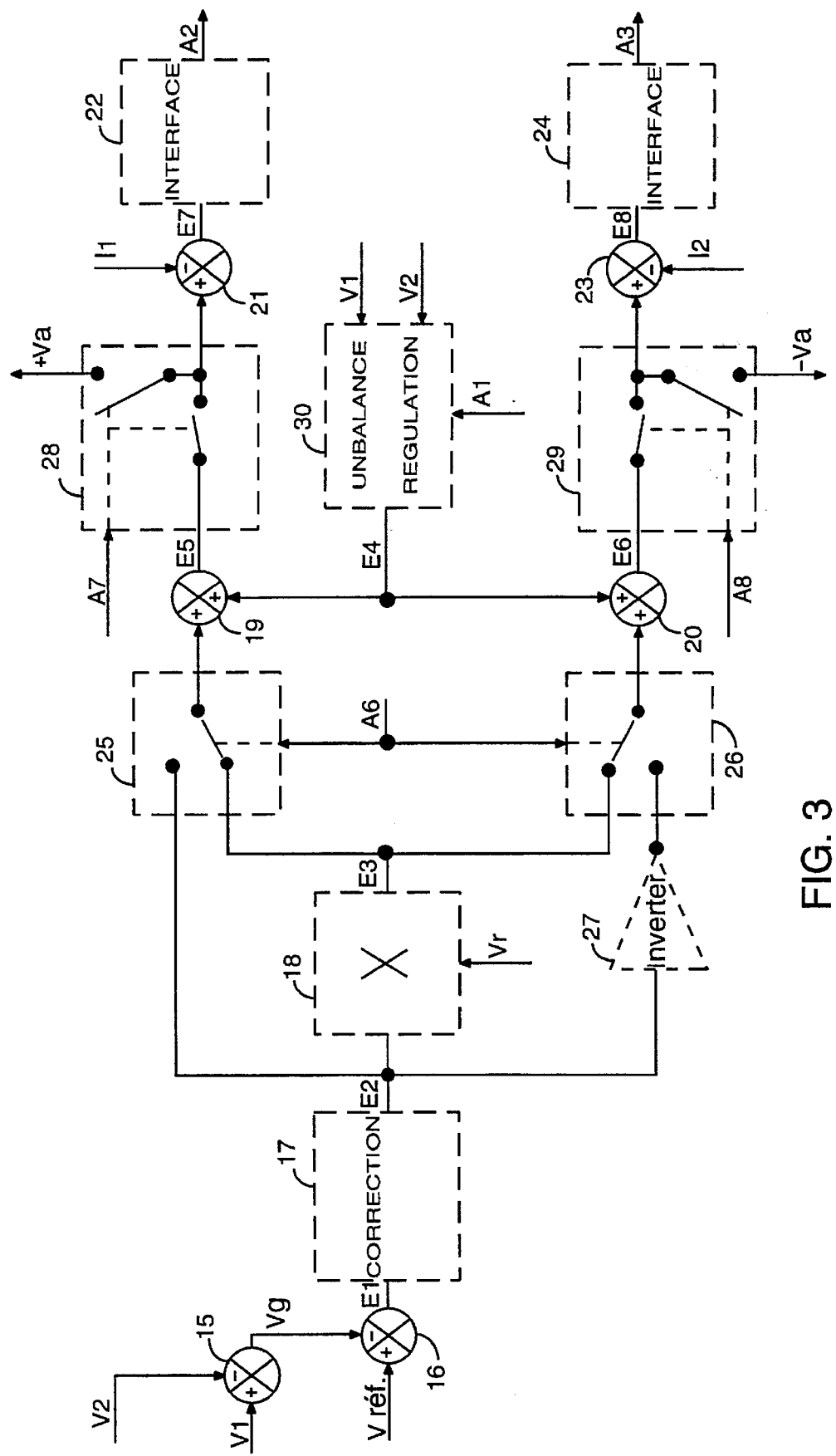
FIG. 3 represents, in block diagram form, a particular embodiment of the control circuit of the twin step-up chopper of FIG. 1.

FIG. 3 illustrates the control circuit 9 of the twin step-up chopper in greater detail.

The control circuit 9 performs regulation of the global output voltage of the twin step-up chopper. In addition it comprises regulation of the imbalance between the voltages V1 and V2, combined with regulation of the current in the positive step-up chopper and of the current in the negative step-up chopper.

A first regulating loop, regulating the global output voltage of the twin step-up chopper, comprises inputs receiving the positive V1 and negative V2 voltages and a circuit 15 performing calculation of the global voltage Vg=V1−V2, between the outputs 7 and 8. A reference DC voltage Vref is, according to the embodiment represented, applied to another input of the regulating loop, a circuit 16 calculating the difference between the reference voltage Vref and the global voltage Vg to supply a first error signal E1 representative of the global voltage error. Signal E1 is applied to the input of a correction circuit 17 which will be described in greater detail with respect to FIG. 6 and which supplies a second error signal E2.

When the power system is a single-phase power system, the voltage regulating loop is preferably completed in such a way as to enable the current provided by the power system to be sinusoidal. To achieve this, the preferred embodiment represented in FIG. 3 comprises a multiplier circuit 18 receiving on one input the signal E2 and on another input an AC signal Vr representative of the power system voltage. The circuit 18 supplies a third, sinusoidal, error signal E3.

In FIG. 3, the signal E3 is added to a fourth error signal E4 in circuits 19 and 20. Error signal E4 is supplied by n unbalance regulation circuit 30 which will be described in greater detail with respect to FIG. 4. The circuits 19 and 20 supply respectively fifth and sixth error signals E5 and E6.

Error signal E5 is used as a reference signal by the current regulating loop of the positive step-up chopper. A circuit 21 calculates the difference between the error signal E5 and a signal representative of the current I1 in the positive step-up chopper and supplies a seventh error signal E7. Signal E7 is applied to the input of a regulation and control circuit, or interface circuit 22, which supplies control signal A2 of the static switch T1 of the positive step-up chopper. Likewise, error signal E6 is used as reference signal by the current regulating loop of the negative step-up chopper. A circuit 23 calculates the difference between error signal E6 and a signal representative of the current I2 in the negative step-up chopper and supplies an eighth error signal E8. The error signal on the negative step-up chopper current E8 is applied to the input of a regulation and control circuit, or interface circuit 24, which supplies the control signal A3 of the static switch T2 of the negative step-up chopper.

When the power system is a three-phase power system and when the power supply is running on the battery, the voltage regulating loop does not comprise the multiplier circuit 18.

In the preferred embodiment illustrated in FIG. 3, which is suitable for both a single-phase power system with sinusoidal current provided by the power system and a three-phase power system and operation on battery with DC current provided by the battery, a switchover is provided. The switchover comprises a selector switch 25 connecting the output of the multiplier circuit 18 to the input of the circuit 19 when the power system is single-phase. However, when the power supply is supplied by the battery or when the power system is three-phase, a signal A6 controls the selector switch so as to connect the input of the circuit 19 directly to the output of the correction circuit 17. Likewise, a selector switch 26 controlled by the same signal A6, connects the input of the circuit 20 to the output of the multiplier circuit 18 when the power system is single-phase and to the output of an inverter 27 connected to the output of the correction circuit 17 when the power system is three-phase or the power supply is running on the battery.

The power supply of FIG. 3 comprises, in addition, means for performing a load call function designed to improve the dynamic range of the voltage regulation in the event of a load impact. These means comprise a forcing selector switch in each current regulating circuit. A selector switch 28 makes it possible, under the control of a control signal A7, to use error signal E5 as reference signal of the positive step-up chopper current regulating loop in the general case and a preset, high, positive DC voltage, +Va in case of a load impact. Likewise, a selector switch 29 makes it possible, under the control of a control signal A8, to use error signal E6 as reference signal of the negative step-up chopper current regulating loop in the general case and a preset, high, negative DC voltage, −Va in case of a load impact. The voltages +Va and −Va can, for example, be about +15 V and −15 V. It is thus possible, in case of a load impact, to quickly increase the energy available at the power supply output. The load call function control circuit supplying signals A7 and A8 will be described further on with respect to FIG. 5.

Figure 4:
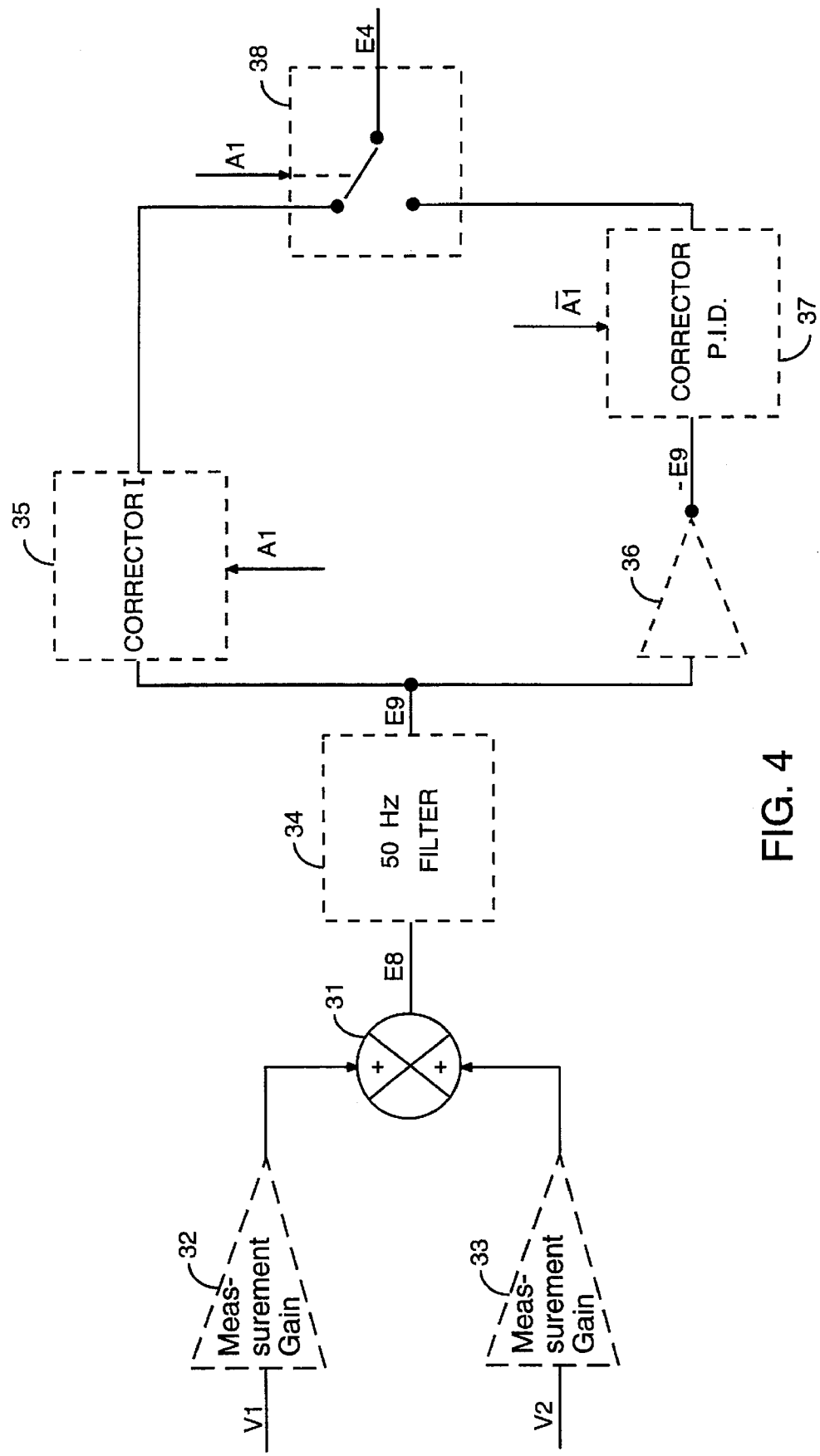
FIG. 4 represents a particular embodiment of the imbalance regulation circuit of the control circuit according to FIG. 3.

The imbalance regulation circuit 30 represented in FIG. 4 supplies the fourth error signal E4 designed to correct an imbalance between the voltages V1 and V2.

On mains system supply the twin step-up chopper comprises three inputs 5, 6 and N, and three outputs 7, 8 and N, whereas on battery it still comprises the three outputs but only two inputs 5 and 6. Although it is possible to envisage separate regulation of V1 and V2 when the power supply is running on the mains system, the dependence of the positive and negative choppers on battery supply imposes regulation of the mid-point N. The solution adopted, i.e. regulation of the global voltage Vg linked with imbalance regulation is applicable both on mains system and on battery supply.

In the particular embodiment of the imbalance regulation circuit represented in FIG. 4, a circuit 31 calculates the sum of the voltages V1 and V2 which are applied thereto, possibly via measurement amplifiers 32 and 33, having a preset measurement gain Gm. The voltage V1 being positive and the voltage V2 negative, this in fact entails calculating the difference between the absolute values of the voltages V1 and V2. The circuit 31 thus supplies an eighth error signal E8, which is applied to the input of a filter 34 designed to filter the mains system frequency, 50 Hz in the figure. The filter output signal is a ninth error signal E9.

This part of the imbalance regulation circuit is identical whether the power supply is operating on the mains power system or on the battery. However, it is indispensable to define two different correction channels for the rest of the regulation. The transfer functions of the twin step-up chopper are in fact different depending on whether the power supply is operating on mains power or on battery.

In fact, on mains power each chopper operates from the voltage sources referenced to the neutral and generated by simple single-phase or three-phase rectification. Each chopper is independent. There is no energy transfer between the two choppers. When operation takes place on the battery on the other hand, we can see in FIG. 1 that the converter can transfer the energy from the battery either totally onto C1 if T2 is still turned-on, or totally onto C2 if T1 is still turned-on, or in a manner divided between C1 and C2 according to the turn-on time of the switches T1 and T2.

The signal E9 is applied to the input of a first corrector 35 and, via an inverter 36, to the input of a second corrector 37. A selector switch 38, controlled by the control signal A1, connects the output of the circuit 38, which supplies the fourth error signal E4, to the output of the first corrector 35 when the power supply is running on the mains power and to the output of the second corrector 37 when the power supply is running on the battery.

In the preferred embodiment of FIG. 4, the first corrector 35 is of the integral type, whereas the second corrector 37 is of the proportional—integral—derivative (P.I.D.) type to ensure stability of the system.

To reduce the disturbances when switching from one correction channel to the other, the integral functions of the correctors 35 and 37 can be set to zero when the corresponding channel is not used. In the embodiment represented, each corrector 35 and 37 comprises a zero reset input of the integrator which it comprises. The zero reset input of the corrector 35 receives the control signal A1, so as to be kept at zero when the power supply is running on the battery, whereas the zero reset input of the corrector 37 receives a signal A1 complementary to A1 so as to be kept at zero when the power supply is running on mains power.

Figure 5:
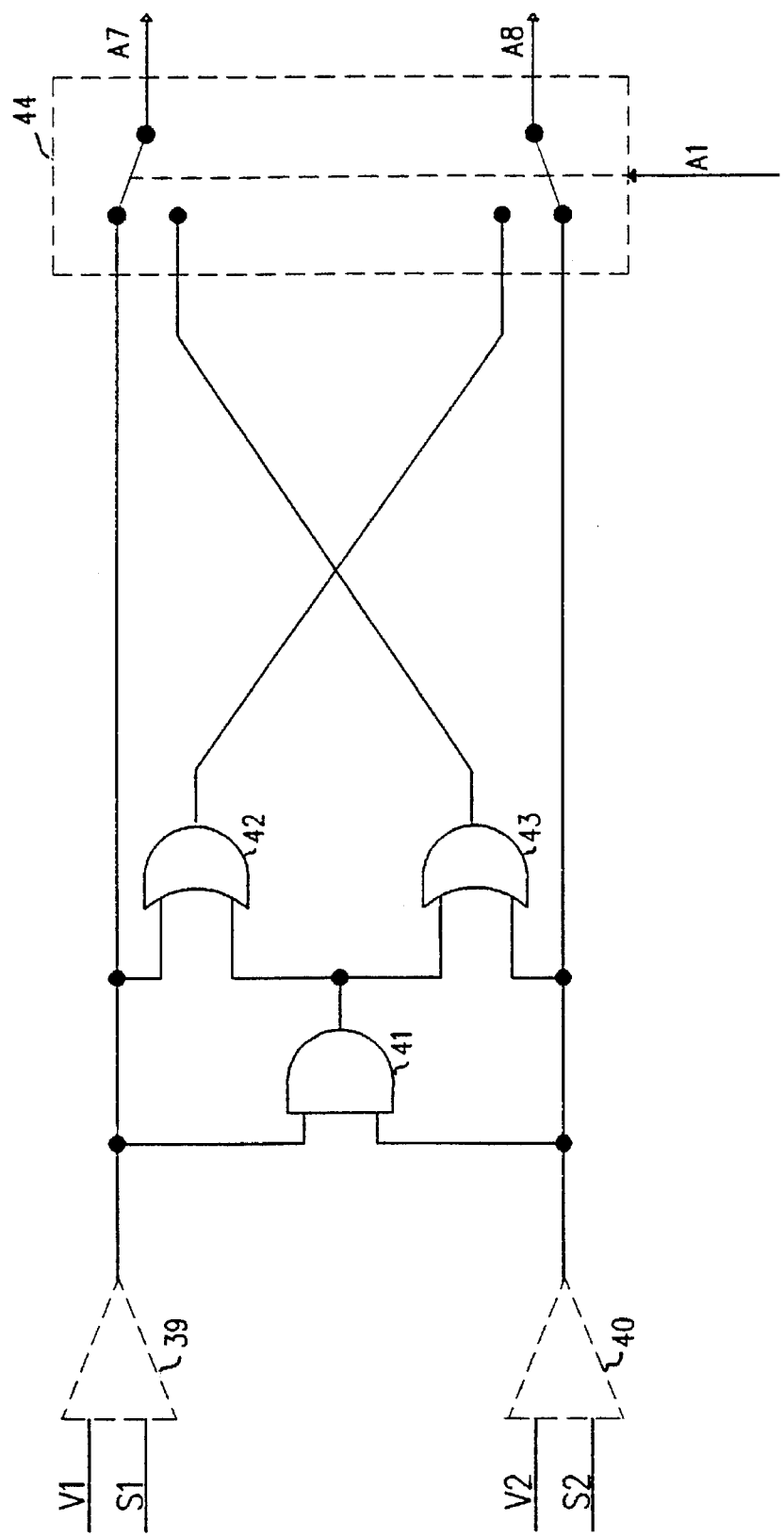
FIG. 5 represents a particular embodiment of a load call function control circuit of the control circuit according to FIG. 3.

A particular embodiment of the load call function control circuit is illustrated in FIG. 5 when the power supply is operating on the mains power system (case represented in the figure), the circuit controls the voltages V1 and V2 separately and acts independently on the current regulating loops of the positive and negative choppers. Thus the voltage V1 is compared to a preset threshold S1 by a comparator 39 which supplies the control signal A7 of the selector switch 28 (FIG. 3). When the voltage V1 is lower than the threshold S1, the signal A7 causes forcing of the positive step-up chopper, using the voltage +Va as the reference signal of its current regulating loop. Likewise, the voltage V2 is compared to a preset threshold S2 by a comparator 40 which supplies the control signal A8 of the selector switch 29. When the voltage V2 is, in absolute value, lower than the threshold S2, the signal A8 causes forcing of the negative step-up chopper, using the voltage −Va as the reference signal of its current regulating loop. The comparators 39 and 40 are preferably comparators with hysteresis and, as an example, the thresholds S1 and S2 can be about 5% lower than the rated voltage of the power system.

When the power supply is running on the battery, it is no longer possible to control the positive and negative step-up choppers independently. The load call function control circuit then acts simultaneously on the positive and negative step-up choppers, case n°1, when V1 is lower than S1 and, at the same time V2 is, in absolute value, lower than S2, to force the reference signals of their current regulating loops respectively to +Va and −Va. If V1 is lower than S1 whereas V2 is correct, case n°2, then the control circuit acts only on the negative step-up chopper. If V2 is, in absolute value, lower than S2 whereas V1 is correct, case n° 3, then the control circuit acts only on the positive step-up chopper. The circuit of FIG. 5 represents a particular embodiment enabling this function to be fulfilled. A logic "AND" circuit 41 is connected to the outputs of the comparators 39 and 40 in such a way as to supply a logic 1 signal when the two voltages V1 and V2 are lower than their respective thresholds, i.e. in case n° 1 above. A logic "OR" circuit 42 is connected to the output of the comparator 39 and to the output of the "AND" circuit 41 in such a way as to supply a logic 1 signal in cases n° 1 and 2. A logic "OR" circuit 43 is connected to the output of the comparator 40 and to the output of the "AND" circuit 41 in such a way as to supply a logic 1 signal in cases n° 1 and 3. A selector switch 44, controlled by the control signal A1, connects a first output of the load call function control circuit, supplying the signal A7, to the output of the comparator 39 when the power supply is operating on mains power and to the output of the logic "OR" circuit 43 when the power supply is operating on battery. Forcing of the positive step-up chopper is thus performed when V1 is lower than S1 on mains power supply and in cases n° 1 and 3 on battery supply, i.e. when V1 and V2 are simultaneously lower than their respective thresholds or when V2 only is lower than the corresponding threshold S2. The selector switch 44 also connects a second output, supplying the signal A8, to the output of the comparator 40 when the power supply is operating on mains power and to the output of the logic "OR" circuit 42 when the power supply is operating on battery. Forcing of the negative step-up chopper is thus performed when V2 is lower than S2 on mains power supply and in cases n° 1 and 2 on battery supply.

Figure 6:
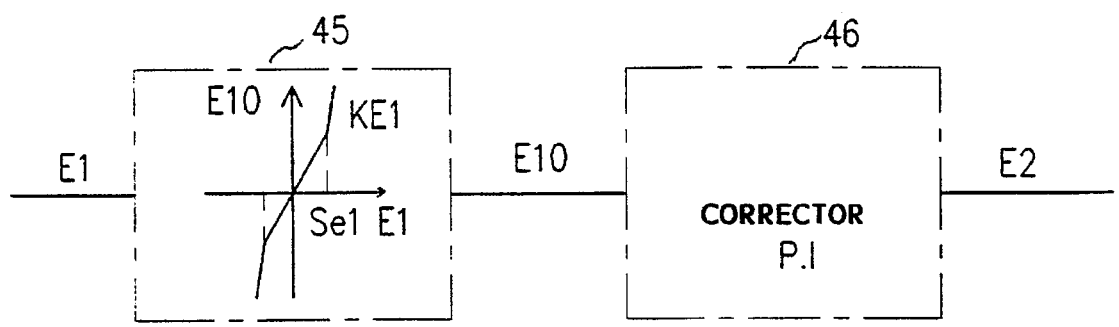
FIG. 6 represents a particular embodiment of the correction circuit of the voltage regulation circuit of the control circuit according to FIG. 3.

FIG. 6 represents a particular embodiment of the voltage regulating loop correction circuit 17. The circuit 17 comprises a fast correction circuit 45 receiving on input the first error signal E1 and supplying a tenth error signal E10.

Signal E10 is applied to the input of a corrector 46 which is, for example, a proportional integral type corrector and which supplies the second error signal E2. So long as the error E1 is low, signal E10 is equal to E1. If on the other hand E1 exceeds, in absolute value, a preset threshold Se1, the error signal E10 is given by:

$$E10=KE1$$

where K is a coefficient greater than 1. The error is thus amplified and correction is faster, notably in the case where load impacts occur. As an example the threshold Se1 may be about 5% of the global voltage Vg and K about 10.

We claim:

1. An uninterruptible power supply, comprising:
   rectifier means, connected to an AC mains power system, having positive and negative outputs;
   a battery, having no center tap or midpoint connection, connected to the outputs of the rectifier means;
   a twin step-up chopper comprising (i) a positive chopper circuit, having an input connected to the positive output of the rectifier means, (ii) a negative chopper circuit, having an input connected to the negative output of the rectifier means, and (iii) a control circuit connected to the twin step-up chopper to control the positive chopper circuit to supply a first DC voltage between an intermediate output and a positive conductor and to control the negative chopper circuit to supply a second DC voltage between said intermediate output and a negative conductor; and
   DC-AC conversion means connected between the negative and positive conductors,
   wherein the mains power system comprises a neutral conductor connected directly to said intermediate output and to an output of the DC-AC conversion means, and wherein the control circuit comprises means for regulating an imbalance between absolute values of the first and second DC voltages.

2. The power supply according to claim 1, wherein the means for regulating an imbalance comprises means for measuring the first and second DC voltages, first difference determining means for determining the difference between the absolute values of the first and second DC voltages, first correction means connected to the first difference determining means, an inverter connected to the first difference determining means and comprising an output connected to an input of a second correction means, switching means having a first input connected to an output of the first correction means, a second input connected to an output of the second correction means, and a control input to connect the first input of the switching means to an output of the means for regulating an imbalance when the power supply device is operating on mains power and to connect the second input of the switching means to said output when the power supply device is operating on the battery.

3. The power supply according to claim 2, wherein the first and second correction means each comprise an integrator and a zero reset input, the integrator of the first correction means being held at zero when the power supply is operating on the battery and the integrator of the second correction means being held at zero when the power supply is operating on the mains power system.

4. The power supply according to claim 1, wherein the control circuit comprises means for regulating the voltage between the positive and negative conductors, first and second current regulating means respectively associated to each of the chopper circuits, and wherein the output of the means for regulating an imbalance is connected to an input of each of the current regulating means.

5. The power supply according to claim 4, wherein the first and second current regulating means each comprise forcing means for forcing a value representative of a reference current to a preset value, and control means for controlling said forcing means comprising means for comparing the first and second DC voltages with respective preset thresholds.

6. The power supply according to claim 5, wherein, when the device is supplied by the battery, the control means supplies a control signal to the forcing means of the positive and negative chopper circuits if the first and second DC voltages are simultaneously lower than their respective thresholds, a control signal to the forcing means of the positive chopper circuit if the second DC voltage is lower than its respective threshold and the first DC voltage is higher than its respective threshold, and a control signal to the forcing means of the negative chopper circuit if the first DC voltage is lower than its respective threshold and the second DC voltage is higher than its respective threshold.

7. The power supply according to claim 4, wherein the voltage regulation means comprises means for measuring the voltage between the positive and negative conductors, second difference determining means for determining the difference between a reference global DC voltage and the voltage between the positive and negative conductors and for supplying a first error signal, and third correction means comprising fast correction means connected to the output of the second difference determining means for supplying a second error signal identical to the first error signal when the first error signal is lower than a preset error threshold and equal to the product of the first error signal and a preset coefficient greater than 1, when the first error signal is higher than said error threshold, and wherein a corrector circuit is connected to the output of the fast correction means.

8. The power supply according to claim 7, wherein the third correction means comprises means for receiving sinusoidal current, connected to the output of the corrector circuit, and switching means for connecting first and second outputs of the voltage regulation means to an output of the means for receiving sinusoidal current when the power supply is running on the mains power system and the mains power system is a single-phase power system, and to connect said first output of the voltage regulation means to the output of the corrector circuit and said second output of the voltage regulation means to the output of the corrector circuit via an inverter when the power supply is running on the battery or when the power system is a three-phase power system.

9. An uninterruptible power supply, comprising:

rectifier means, connected to an AC mains power system, having positive and negative outputs;

a battery connected to the outputs of the rectifier means;

a twin step-up chopper comprising (i) a positive chopper circuit, having an input connected to the positive output of the rectifier means, (ii) a negative chopper circuit, having an input connected to the negative output of the rectifier means, and (iii) a control circuit connected to the twin step-up chopper to control the positive chopper circuit to supply a first DC voltage between an intermediate output and a positive conductor and to control the negative chopper circuit to supply a second DC voltage between said intermediate output and a negative conductor, said control circuit comprising means for regulating an imbalance between absolute values of the first and second DC voltages, said means for regulating an imbalance comprising means for measuring the first and second DC voltages, first difference determining means for determining the difference between the absolute values of the first and second DC voltages, first correction means connected to the first difference determining means, an inverter connected to the first difference determining means and comprising an output connected to an input of a second correction means, switching means having a first input connected to an output of the first correction means, a second input connected to an output of the second correction means, and a control input to connect the first input of the switching means to an output of the means for regulating an imbalance when the power supply device is operating on mains power and to connect the second input of the switching means to said output when the power supply device is operating on the battery, the first and second correction means each comprising an integrator and a zero reset input, the integrator of the first correction means being held at zero when the power supply is operating on the battery and the integrator of the second correction means being held at zero when the power supply is operating on the mains power system; and DC-AC conversion means connected between the negative and positive conductors, wherein the mains power system comprises a neutral conductor connected directly to said intermediate output and to an output of the DC-AC conversion means.

10. An uninterruptible power supply, comprising:

rectifier means, connected to an AC mains power system, having positive and negative outputs;

a battery connected to the outputs of the rectifier means;

a twin step-up chopper comprising (i) a positive chopper circuit, having an input connected to the positive output of the rectifier means, (ii) a negative chopper circuit, having an input connected to the negative output of the rectifier means, and (iii) a control circuit connected to the twin step-up chopper to control the positive chopper circuit to supply a first DC voltage between an intermediate output and a positive conductor and to control the negative chopper circuit to supply a second DC voltage between said intermediate output and a negative conductor, the control circuit comprising means for regulating the voltage between the positive and negative conductors, first and second current regulating means respectively associated to each of the chopper circuits, and wherein the output of the means for regulating an imbalance is connected to an input of each of the current regulating means, the first and second current regulating means each comprising forcing means for forcing a value representative of a reference current to a preset value, and control means for controlling said forcing means comprising means for comparing the first and second DC voltages with respective preset thresholds; and DC-AC conversion means connected between the negative and positive conductors, wherein the mains power system comprises a neutral conductor connected directly to said intermediate output and to an output of the DC-AC conversion means, and the control circuit comprises means for regulating an imbalance between absolute values of the first and second DC voltages.

11. The power supply according to claim 10, wherein, when the device is supplied by the battery, the control means supplies a control signal to the forcing means of the positive and negative chopper circuits if the first and second DC voltages are simultaneously lower than their respective thresholds, a control signal to the forcing means of the positive chopper circuit if the second DC voltage is lower than its respective threshold and the first DC voltage is higher than its respective threshold, and a control signal to the forcing means of the negative chopper circuit if the first DC voltage is lower than its respective threshold and the second DC voltage is higher than its respective threshold.

* * * * *